(12) United States Patent
Dial

(10) Patent No.: US 7,510,301 B2
(45) Date of Patent: Mar. 31, 2009

(54) SECURITY LOCK, LOCKING SYSTEM AND KIT

(76) Inventor: Elizabeth A. Dial, PO Box 127987, San Diego, CA (US) 92112-7987

( * ) Notice: Subject to any disclaimer, the term of this patent is extended or adjusted under 35 U.S.C. 154(b) by 0 days.

(21) Appl. No.: 11/583,574

(22) Filed: Oct. 19, 2006

(65) Prior Publication Data

US 2007/0091583 A1    Apr. 26, 2007

Related U.S. Application Data

(60) Provisional application No. 60/730,526, filed on Oct. 26, 2005.

(51) Int. Cl.
*F21V 33/00* (2006.01)
(52) U.S. Cl. ............ 362/253; 362/23; 362/116; 362/100; 70/30; 70/22; 70/52; 70/77; 70/60
(58) Field of Classification Search ............ 362/23, 362/253, 116, 100; 70/1, 22, 25, 58, 30, 70/52, 53, 77, 57.1, 59, 60, 330, 331, 332
See application file for complete search history.

(56) References Cited

U.S. PATENT DOCUMENTS

| | | | | |
|---|---|---|---|---|
| 4,823,569 A | * | 4/1989 | Leinoff et al. .......... | 70/59 |
| 6,086,223 A | * | 7/2000 | Fogle et al. .......... | 362/253 |
| 6,192,721 B1 | * | 2/2001 | Monteleone .......... | 70/55 |
| 6,330,944 B1 | * | 12/2001 | DeMichele .......... | 206/315.3 |
| 7,013,685 B2 | * | 3/2006 | Francke .......... | 70/18 |
| 2005/0201076 A1 | * | 9/2005 | Marcelle et al. .......... | 362/23 |
| 2006/0075794 A1 | * | 4/2006 | Ling et al. .......... | 70/58 |

* cited by examiner

*Primary Examiner*—Sandra L O'Shea
*Assistant Examiner*—Jessica L McMillan
(74) *Attorney, Agent, or Firm*—Michael J. Persson; Lawson & Persson, P.C.

(57) ABSTRACT

A security lock, locking system, kit, and personal apparel, such as garments, purses, and luggage that include the security lock. The security lock is a typical combination lock, which includes a body and a locking member in communication with a lock mechanism disposed within the body and a user interface disposed upon or within the body. A battery powered light is disposed proximate to the user interface such that the light illuminates the symbols on the movable members when power is supplied thereto. The system includes a security lock, with or without a light, and an adjustable cable. The kit and apparel include the system and a pouch.

12 Claims, 6 Drawing Sheets

SECURITY LOCK, LOCKING SYSTEM AND KIT

CLAIM OF PRIORITY

The application claims the benefit of priority, pursuant to 35 U.S.C. 119(e), of U.S. Provisional Patent Application Ser. No. 60/730,526, filed on Oct. 26, 2005.

FIELD OF THE INVENTION

The present invention relates to the field of security locks and, in particular, to portable security locks, security locking systems and kits for securing garments and other personal belongings from opportunistic theft, and garments and other apparel integrating such systems and kits.

BACKGROUND OF THE INVENTION

The opportunistic theft of personal belongings is, unfortunately, a frequent occurrence in public places and is a risk that everyone faces when they are out in public. Because of the risk of their belongings being stolen, most people are hesitant to leave belongings, such as coats, briefcases, luggage, or the like, unattended in public places. Accordingly, people are forced to carry their belongings with them at all times, even when the belongings are unlikely to be needed and could otherwise be left.

The inventor of the present invention has encountered this problem in a number of situations. For example, during the snowy winter months when a coat is required outdoors, the inventor found there was nowhere to leave her heavy coat while strolling through the mall. Therefore, her choices were to carry the heavy garment, place it somewhere and risk having it stolen, or to leave it in the car and walk through the bitter cold to the mall. A similar situation occurred when traveling. While waiting for a flight, the inventor needed to use the restroom. However, rather than leave her carry-on bag, coat and purse in the waiting area, she was forced to bring all of her belongings with her.

In response to these situations, the inventor purchased a cable style bicycle lock to secure her garment to one of the mall's benches during her next trip. Unfortunately this solution was not ideal, as the heavy cable was too bulky and heavy to continually carry in the pocket of the garment or even in a purse or bag. Further, the cable was too tightly wound and would not release its "curl" enough to slip easily through the garment's sleeve. As this was the case, it was readily apparent that the bicycle lock would not be adapted for use in securing a carry-on bag or purse in addition to a garment. Based upon these drawbacks, the inventor determined that a standard bicycle style lock was not suitable for either situation.

The inventor then searched for other commercially available products that that might be easily carried and stored and would deter opportunistic theft of garments and personal belongings, but found that none were available. A search of patents describing products that might solve these problems was also undertaken, and resulted in the identification of two patents that had some relevance to the problem at hand.

One such product is described in U.S. Pat. No. 4,986,457, which discloses a closed loop cable system that is fed through the arms of a coat and is permanently attached thereto. This is described as a single-use system for use in clothing stores, in which the cable cut off by a store clerk when the coat is purchased. Accordingly, it is not adapted for reuse by consumers. Further, the system is only meant to serve as an identifier that the coat was not worn into the store by a customer and, hence is not adapted to attach to a fixed object. Finally, this device has a fixed length and is not adjustable by the user.

Another garment locking system is disclosed in U.S. Pat. No. 6,550,293, which discloses a system that utilizes a wire disposed upon a locking spring loaded spool, which allows the wire to be extended and retracted in order to vary its length. This system is an improvement over the product described in U.S. Pat. No. 4,986,457, insofar as it is reusable, has an adjustable length and is adapted to attach to a fixed object. However, this system does not have any means for securing the cable to the lock such that only the owner may remove it. Accordingly, it is primarily adapted for use in preventing garments from being stolen while the owner is nearby and could periodically check on the garment, and may not be relied upon to prevent theft of such a garment when left completely unattended.

As commercially available products were not available and products described in issued patents did not solve the problem, the inventor decided to develop her own system. Her first prototype was simply a thin wire cable of sufficient length to extend through the arms of the garment, with loops at each end through which a small keyed padlock could be secured. This prototype worked reasonably well, as the cable was light enough to be easily transported and was flexible enough to pass through the arms of the garment. However, the inventor found that this was not ideal. First, the cable became unlooped when stored in her pocket or purse, making it difficult to access other objects carried therein. Second, the cable needed to be of sufficient length to pass through the garment and other belongings and be secured to a stationary object. Thus, the cable was made longer than would normally be necessary, resulting in the excess cable causing a tripping hazard. Third, the use of a keyed type padlock required the use of separate keys, which must be carried and identified before the lock could be opened.

Based upon the drawbacks identified in the initial prototype, the inventor endeavored to modify the design to include a carrying pouch, to allow the length of the cable to be adjusted, and to utilize a combination type lock that didn't require the use of a separate key. This resulted in a prototype that forms one embodiment of the present invention. This prototype overcame the drawbacks inherent in the first prototype and solved the problems that lead to its development. However, the inventor noted that it was difficult to read the numbers on the combination lock in dimly lit places.

In response to the difficulty in reading the numbers, the inventor searched for a commercially available combination lock that included an integral light. However, she once again found that such a product was not available. Accordingly, she developed a combination lock for use with her system that integrating a light into the design. This improvement proved to be an important one and forms the basis for the preferred embodiment of the present invention.

SUMMARY OF THE INVENTION

The invention is a security lock, security system, and kit that includes the security lock. The security lock is a typical combination lock, which includes a body and a locking member in communication with a lock mechanism disposed within the body. The locking member is adapted to be securely held within the lock mechanism when the lock mechanism is in a locked position, and to be moved from the lock mechanism when the lock mechanism is in an unlocked position. A user interface is disposed upon or within the body and is made up of numbers, letters, or other symbols deployed on movable members that control the position of the lock mechanism and, hence, the locking member. A battery-powered light is disposed proximate to the user interface such that the light illuminates the symbols on the movable members when power is supplied thereto.

The security lock of the preferred embodiment includes a user interface having at least two, and preferably three, rotatable discs upon which symbols, such as numbers or letters, are disposed. This preferred user interface controls the operation of the locking member. In the preferred embodiment, the locking member is a "U" shaped locking member such as those commonly utilized in connection with dial type padlocks. In others, such as those shown in FIGS. 1A and 1B, the locking member is a hook-type locking member that rotates upon on fixed axes outward toward the edge of the body when moving to a locked position and inward toward the center of the body when moving to an unlocked position. The combination of the preferred security lock may be personally set and reset by the purchaser in a manner similar to common luggage locks.

The preferred light is an LED type light, such as those commonly used in connection with mini-flashlights and lighted keychains, and is activated by depressing a button-type switch on the body of the lock. When integrated with the preferred user interface, the light is mounted on the surface of the body and includes a reflector for reflecting the illumination from the light onto the numbers on the rotating discs. In other embodiments, the light is mounted within the body and a reflector is provided proximate to an opening in the body to reflect the illumination from the light across the numbers on the discs. In some embodiments, the reflector is manufactured of a material that absorbs most or all of the light directed thereon. In such embodiments, the reflector serves as a barrier to light being emitted in any direction except for across the user interface.

The security system of the present invention includes a security lock in combination with a light and flexible wire cable of a length sufficient to at least pass through the arms of a coat. The cable is flexible, lightweight, and sufficiently durable to prevent a potential thief from cutting through it with ordinary scissors. A security lock connection is disposed at either end of the cable and is adapted to allow the ends of the cable to be secured by the security lock.

The preferred cable is a 1/16-gauge plastic coated cable of approximately six feet in length. When used with the preferred security lock, the security lock connection is a loop at each end of the cable of sufficient diameter to allow the locking member of the security lock to pass therethrough. However, in embodiments in which an integral security lock is utilized, the security lock connections may be fixedly attached, or formed integral, to the body and locking member. In such embodiments, the security lock is preferably mounted so that it will swivel; making it easier for the person securing it to line up the male to female portions and to see the numbers with greater ease by moving it to suit their line of vision.

In some embodiments of the system and kit, the cable includes a cable adjustment that allows the length of the cable to be shortened. In one such embodiment, the cable adjustment allows the cable to be shortened to one half of its fully extended length. This cable adjustment eliminates the possibility of becoming entangled with the excess cable while allowing the cable to be extended to secure multiple garments. In some such embodiments, the cable is divided into two shorter cables that are attached together by a pair of sliding members that each secure one cable and allow the other cable to slide therethrough. Sliding members each include a thumbscrew, or other art recognized device for fixing the locations of the cable relative to one another. In still other embodiments, the cable adjustment takes the form of a locking spring loaded spool, such as that disclosed in U.S. Pat. No. 6,550,293.

The kit includes the security system and a pouch in which the system is stored and attached to a garment. The pouch is sized to accommodate the system when the cable is wound and preferably is a four-inch by four-inch flat nylon pouch with a top closure, such as a zipper, snap hook and loop fastener, or the like. Some embodiments of the pouch include a fastener for attaching the pouch to a garment. In some such embodiments, one end of the pouch has a hole punched completely through both layers thereof to accommodate a removable hinged clip, like those commonly utilized on conventioneer or company ID badges. In other embodiments, the fastener is a snap, buttonhole, or portion of a hook and loop fastener, or the like, that mates with a mating portion affixed to the garment. In operation, the system is wound up into a palm sized "curl" and slipped into the pouch, and the kit is attached to a garment. The preferred kit weighs mere ounces and does not significantly alter the manner in with the garment falls or hangs on the user. In some embodiments of the invention, such as those that are used as promotional items, the pouch will include a logo or other marketing information displayed on one of the faces thereof.

Some embodiments of the kit include an item of apparel. The apparel of the present invention may be a common garment, such as a coat, sweater, jacket or the like, a purse, or a piece of luggage, which includes a pouch and the system of the present invention. In some embodiments, the pouch may be permanently affixed to the apparel and take the form of a specialized "pocket" sized to accommodate the system. In others, the apparel includes mating portion of the fastening means of the kit attached thereto to allow the kit to be removed from the apparel.

Before first using the preferred security system, the user will remove it from the pouch and program a combination for the security lock as directed. When securing the system to a garment, the user will hold one end of the cable in one hand, and the other end of the cable in the other hand; drop one end of the cable down the sleeve of the garment while continuing to securely hold the other end of the cable. The end of the cable will drop out the sleeve of the garment, where the user will retrieve it and tether the cable around a fixed or heavy object such as a coat rack hanger bar, theatre seat, chair, barstool, bench, etc. The user will then secure the two ends together using the locking member, and move the lock mechanism to a locked position, effectively securing the garment from opportunistic theft. When the system is used to secure another item of apparel, such as a purse or piece of luggage, the user will loop one end of the cable through a handle of the purse of luggage, loop the other end around a fixed or heavy object, secure the lock, and then adjust the length of the cable to eliminate most, if not all, slack that is present.

The system has a number of potential uses. For example, the system can be used to secure a coat to a shopping mall's bench while walking or shopping at the mall.

The system may be used to tether a coat to a seat at the movies, a sporting event, concert of the like so that the user may leave her seat to go to the restroom, etc., while ensuring that both the coat and seat will be saved.

The system may be used in bars and restaurants to secure coats to barstools or chairs using two systems; one secures coats to the chair, and another system secures the chair to another solid object, such as a table leg, bar rail, or the like.

The system may be used in a user's home closet in which expensive coats are stored to provide an additional obstacle to thieves, or in hotel closets to prevent theft by maids, other hotel employees, or guests.

The system may be used at a coat-check room to secure the coat to the rack. In the case of unattended rooms, the user would secure the system herself. In the case of a professionally attended room, a user would open the lock and hand it to the clerk, who attaches the coat to the rack. The user would then return to claim her coat and give the attendant the combination, after which a new combination could be programmed.

The system may be used to tether bags to an airport "Smart Cart". It may also be used to tether the cart, either loaded or unloaded, to the bank of chairs outside an airlines' courtesy lounge, which do not allow the carts inside.

The system may be used to secure a baby stroller while going into a coffee shop or while shopping.

The system may be used at the beach or park to tether beach chairs, bags, umbrellas, or surfers' wet suits and gear.

The system may be used to prevent bags from being taken from vehicles by using the system to tether the bags to a seat or the trunk's hinge.

The system may also be used to secure skateboards, golf bags, wetsuits, or other sporting equipment that does not typically have a locking system associated with it.

Finally, the system may be used as a gunlock, effectively securing multiple firearms together.

Therefore, it is an aspect of the invention to provide a security lock, locking system, kit and apparel that may be used to securing garments and other personal belongings from opportunistic theft.

It is a further aspect of the invention to provide a security lock, locking system, kit and apparel that may be used and reused.

It is a further aspect of the invention to provide a security lock, locking system, kit and apparel that is lightweight and may be conveniently stored during transport.

It is a further aspect of the invention to provide a locking system, kit and apparel having a combination style security lock that cannot be removed without knowing the correct combination and does not require the user to carry a separate key.

It is a further aspect of the invention to provide a security lock, locking system, kit and apparel that include an integral light on the security lock, such that the user interface of the securiiy lock is easily seen and manipulated in dimly lit places.

It is a further aspect of the invention to provide a security lock, locking system, kit and apparel having a cable of adjustable length such that excess cable does not present a tripping hazard.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1A:
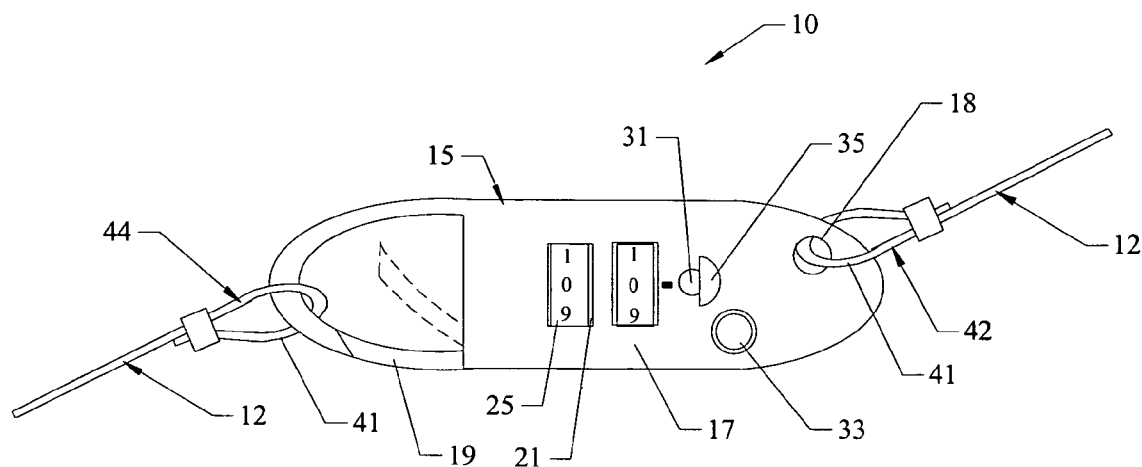
FIG. 1A is a top view of one embodiment of the locking system showing a security lock to which a cable is attached.
Figure 1B:
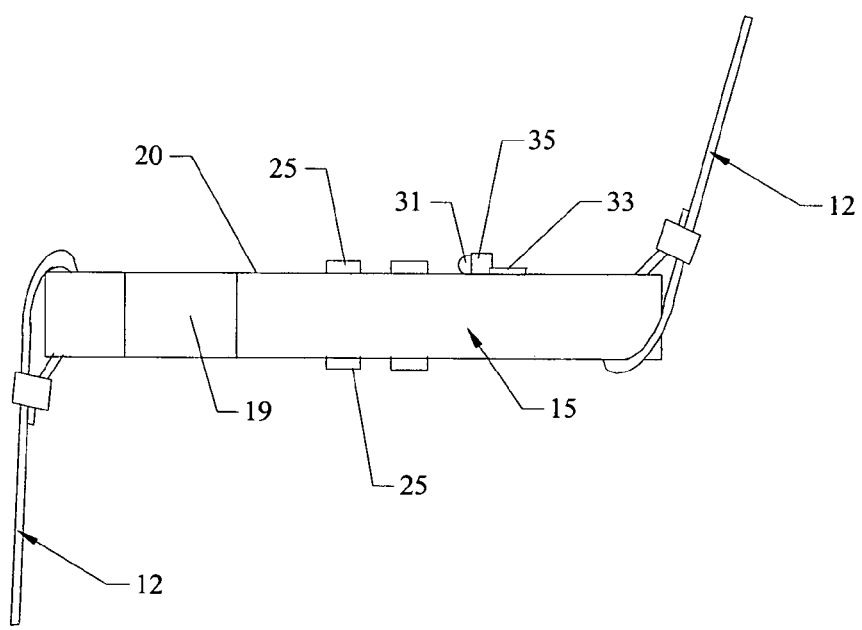
FIG. 1B is a side view of the locking system of FIG. 1A.

Referring first to FIGS. 1A and 1B, one embodiment of the locking system 10 is shown. The locking system 10 includes a security lock 15 and a cable 12. The security lock 15 is a combination lock that includes a body 17 and a locking member 19 in communication with a lock mechanism (not shown) disposed within the body 17. The body of the security lock 15 preferably includes a cable opening 18 at the end opposite the locking member 19, which is dimensioned to allow one end 22 of the cable 22 to be securely fastened thereto. It is preferred that the body 12 be painted one of a number of colors to allow the user to identify which security locks 15 is being used, and consequently which combination to use. However, it is recognized that the body 17 of each lock could be painted the same color and that another identifier, such as a serial number, could be use to identify the lock. Similarly, no identifier could be used and the user could simply set each security lock 15 to the same combination.

The locking member 19 is adapted to be securely held within the lock mechanism when the lock mechanism is in a locked position, and to be moved from the lock mechanism when the lock mechanism is in an unlocked position. The preferred locking member 19 is a hook type locking member 19, which operates in a manner similar to a climber's carabineer. The locking member 19 of FIGS. 1A and 1B rotates outward upon on fixed axes toward the body 17 when moving to a locked position, as denoted by the solid lines in FIG. 1A, and inward toward the center of body 17 when moving to an unlocked position, as denoted by the dashed lines in FIG. 1A. As noted above, the movement of the locking member 19 is controlled by the lock mechanism. The particular lock mechanism chosen is not of importance to the invention and any one of the multitudes of art recognized lock mechanisms maybe used. Accordingly, the particular lock mechanism has not been described in great detail.

A user interface 21 is preferably disposed within the body 17 and extends through openings 23 therethrough. In the embodiment of FIGS. 1A and 1B, the user interface 21 is a pair of rotatable discs 25 upon which numbers are disposed. These discs 25 are rotated until the correct number combination is displayed, at which time the lock mechanism is unlocked. As shown in FIG. 1B, the preferred discs 25 extend through the body 17, which allows them to be more easily manipulated. However, it is recognized that other user interfaces 21, such as those described herein, or others known in the art, may be substituted to achieve similar results.

It is preferred that the combination of the security lock 15 may be personally set and reset by the purchaser in a manner similar to common luggage locks. Therefore, the preferred lock mechanism includes such a means for changing a combination of the security lock 15. However, this ability is not critical to the invention and, in some embodiments, the combination of the security lock 15 is pre-set at the factory.

Figure 2:
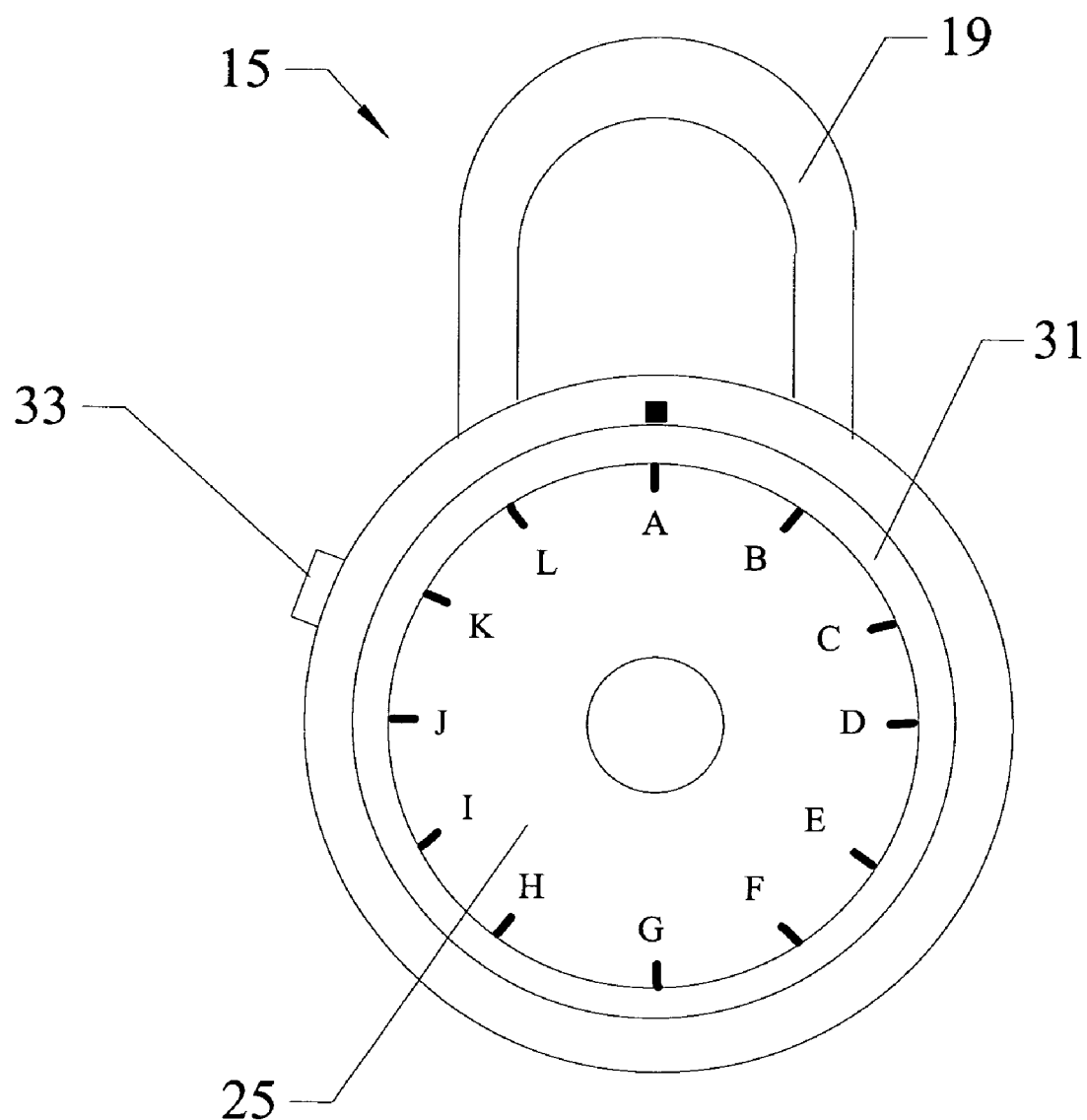
FIG. 2 is a face view of an alternative embodiment of the security lock of the present invention.

The preferred security lock 15 includes a battery-powered light 31, which is disposed proximate to the user interface 21 such that the light 31 illuminates the symbols on the rotatable discs 25 when power is supplied thereto. The preferred light 31 is an LED type light, such as those commonly used in connection with mini-flashlights, lighted keys and keychains, and is activated by depressing a button type switch 33 on the body 17 of the lock 15. When integrated with the preferred user interface 21, the light 31 is mounted on the top surface 20 of the body and includes a reflector 35 for reflecting the illumination from the light 31 onto the numbers on the rotating discs 25. However, in other embodiments of the system 10, the light 31 is disposed in alternative arrangements, or eliminated altogether. For example, in the embodiment of the security lock 15 shown in FIG. 2, a single dial type user interface 21 is used, the light 31 is mounted within the body 17 and a reflector 35 is provided around the circumference of the dial 40 to reflect the illumination from the light 31 downward onto the numbers on the dial. Although this arrangement is shown, such a reflector 35 could also be replaced by the light 31 and reflector 35 of the embodiments of FIGS. 1A and 1B or FIGS. 6A and 6B.

Referring again to FIGS. 1A and 1B, the cable 12 of the system is a light and flexible wire cable of a length sufficient to at least pass through the arms of a coat. The cable is flexible, lightweight, and sufficiently durable to prevent a potential thief from cutting through it with ordinary scissors. A security lock connection 41 is disposed at either end 42, 44 of the cable 12 and is adapted to allow the ends of the cable 12 to be secured by the security lock 15. The cable 12 of FIGS. 1A and 1B is a 1/16-gauge plastic coated cable of approximately six feet in length. As shown in FIGS. 1A and 1B, when used with the preferred security lock 15, the security lock connection 41 is a loop at each end of the cable of sufficient diameter to allow the locking member 19 of the security lock to pass therethrough.

Figure 3A:
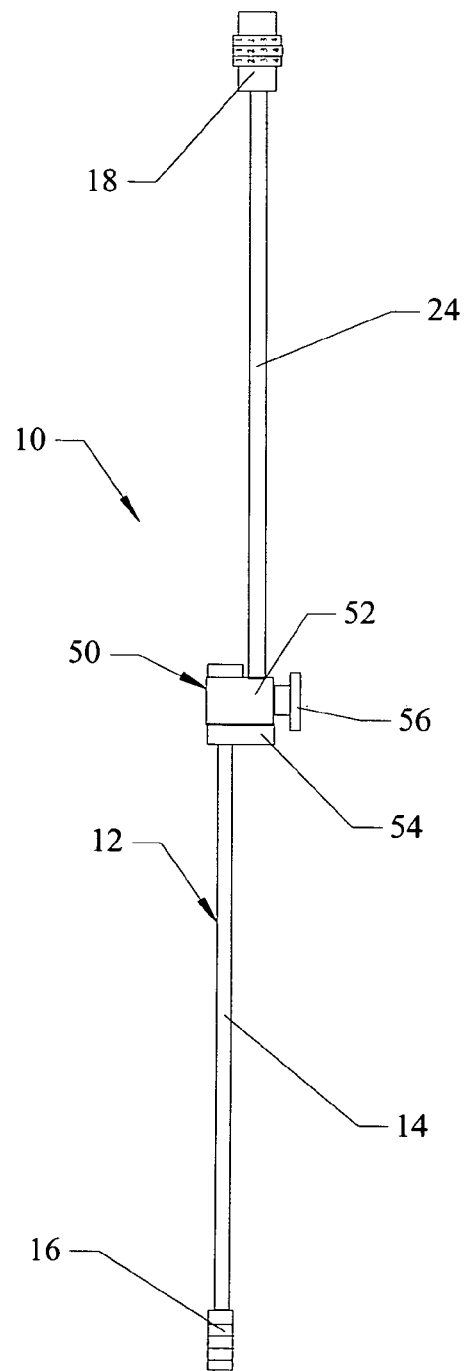
FIG. 3A is a side view of one embodiment of the system of the present invention utilizing a cable having an adjustable length and a barrel style security lock, in which the cable is in a fully extended position.
Figure 3B:
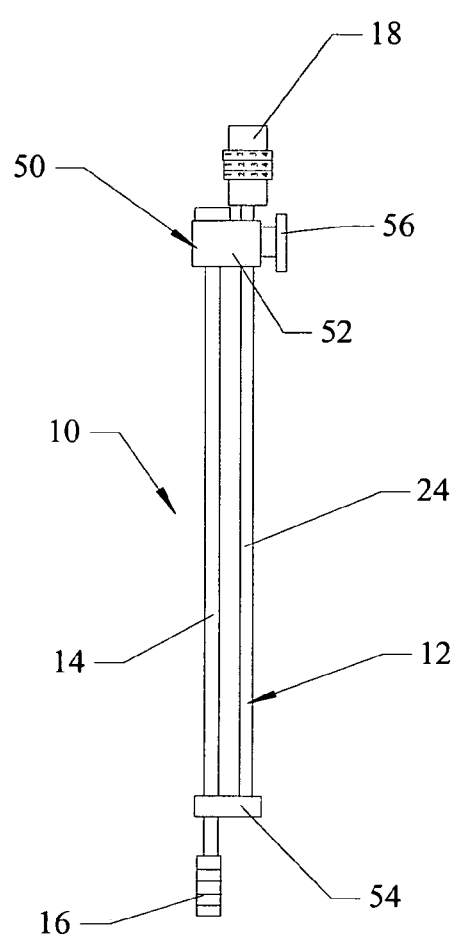
FIG. 3B is a side view of the embodiment of the system of FIG. 1A in which the cable is in a fully retracted position.

Referring now to FIGS. 3A and 3B, an alternative embodiment of the system 10 is shown. This embodiment includes a cable 12 that is divided into a first portion 14 to which a male portion 16 of a barrel style combination lock is attached, and a second portion 24 to which a female portion 18 of a barrel style combination lock is attached. First portion 14 and second portion 24 of cable 12 are slidably attached to a cable adjustment 50 that allows the overall length of the cable 12 to be shortened to nearly one-half of its fully extended length. In this embodiment, the cable adjustment 50 is a pair of sliding members 52, 54 that each secure one portion 14, 24 of the cable 12 and allow the other portion 14, 24 of cable 12, 14 to slide therethrough. As shown in FIG. 3A, the sliding member 52, 54 are proximate to each other when the system 10 is fully extended. However, in FIG. 1B, the second sliding member 54 is fixedly attached to second portion 24 of cable 12 and slides along the first portion 14 of cable 12 until it reaches its desired position. A thumbscrew 56 on the first sliding member 52 is then tightened, effectively locking both portions 14, 24 of cable 12 in a fixed position.

Although the cable adjustment of FIG. 3A and 3B has been described in detail, it is recognized that a number of other types of cable adjustments, including the locking spring loaded spool shown and described in U.S. Pat. No. 6,550,293, hand operated spools or others that are known in the art, may be readily substituted for the embodiment shown herein. Further, it is recognized that some embodiments of the system may not include any cable adjustment at all.

Figure 6A:
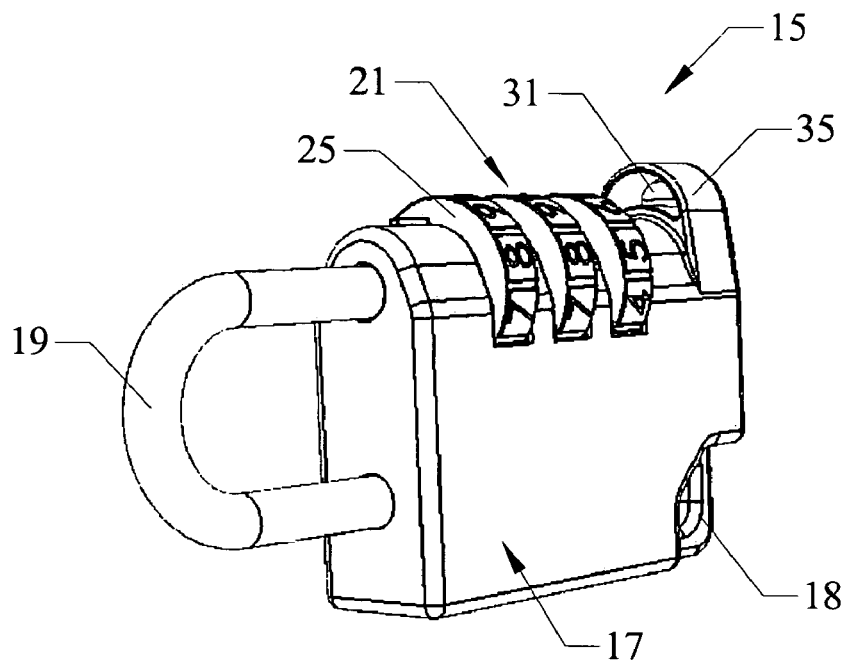
FIG. 6A is a side isometric view of the preferred security lock of the present invention.
Figure 6B:
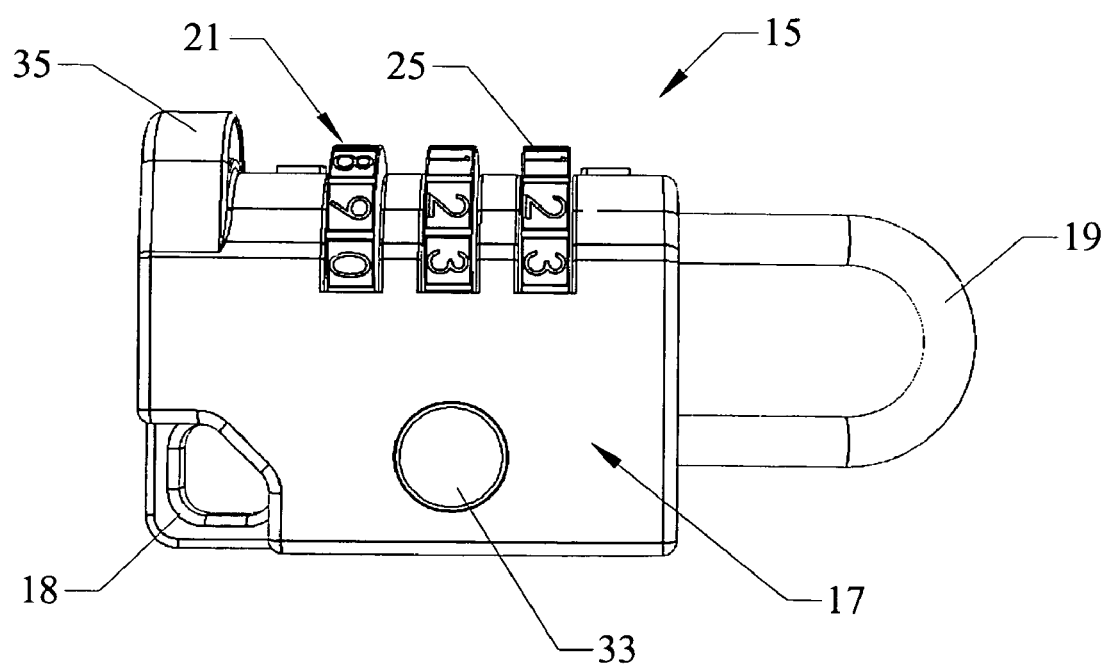
FIG. 6B is a side view of the preferred security lock of FIG. 6A.

Referring now to FIGS. 6A and 6B, the preferred security lock 15 of the present invention is shown. The preferred security lock 15 includes a body 17 that is manufactured of a molded plastic material. Such a material is preferred due to its light weight, relatively low cost of manufacture, and the ability to mold both the reflector 35 and cable opening 18 integral thereto. The preferred security lock includes a user interface 21 made up of three rotatable discs 25 and a "U" shaped locking member 19, which operates in a manner similar to conventional padlocks. The reflector 35 of this embodiment is a semicircular opening that is formed integral to the body 17 proximate to the discs 25 and is adapted to house an LED type light 31. In this embodiment, the reflector does not include any reflective material disposed therein and serves primarily as a means for preventing light from being emitted in any direction except onto the discs 25. This is preferred as the amount of light produced by the LED type light 31 is sufficient to illuminate the discs 25 without the additional light reflected back from the reflector. However, in other embodiments, a reflective paint or other material may be applied to the inside of the reflector to further enhance the amount of light directed over the discs. The LED light 31 is activated by depressing the button type switch 33 on the body 17 of the lock 15. Finally, it is noted that the preferred security lock 15 of FIGS. 6A and 6B has a combination that is resettable by the user.

Figure 4:
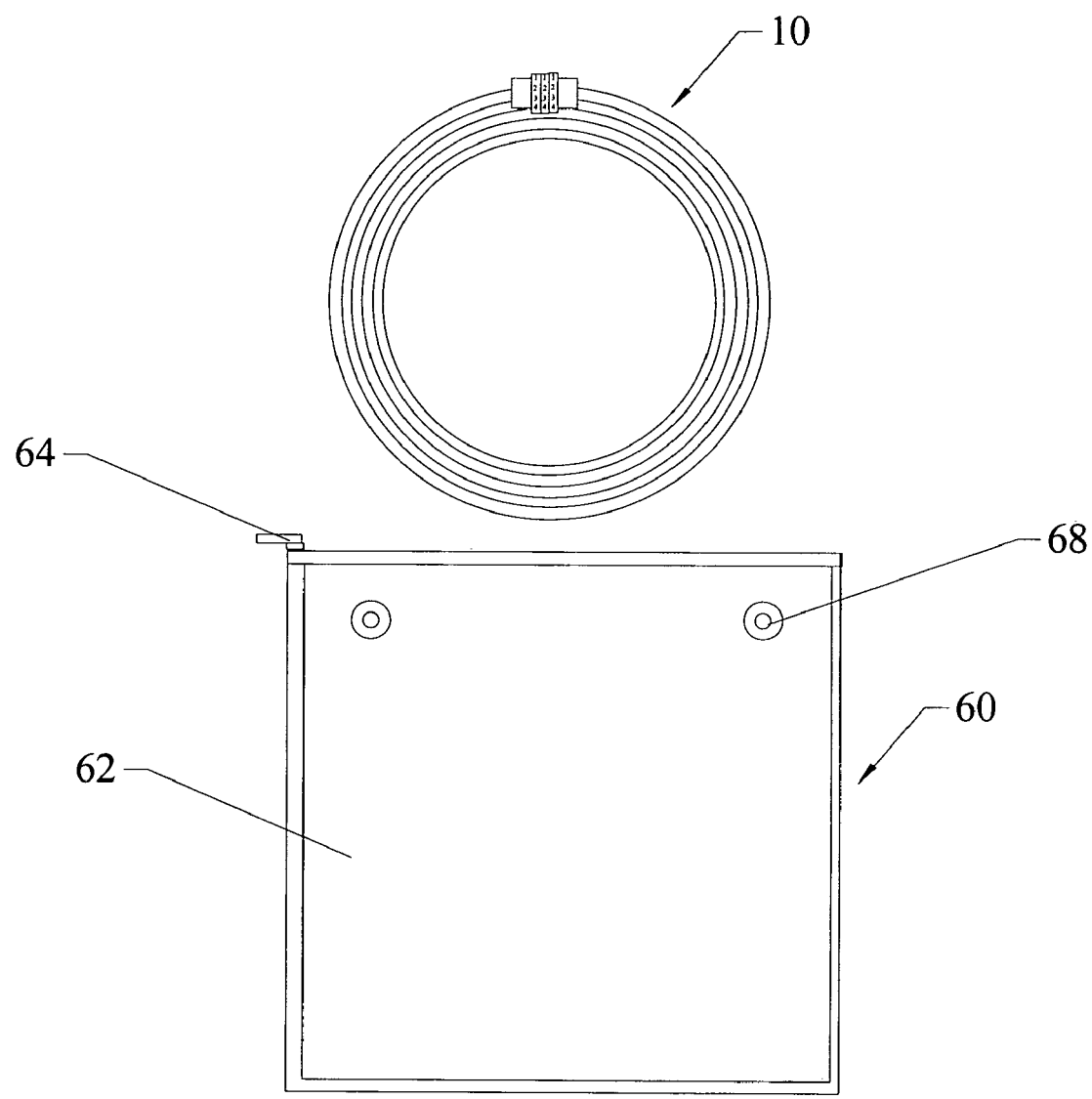
FIG. 4 is a diagrammatic side view of one embodiment of the kit of the present invention showing the locking system with cable looped in position to be inserted within the pouch.

FIG. 4 shows the kit 60 of the present invention. The kit 60 includes the system 10 and pouch 62 into which the system is disposed. As shown in FIG. 4, the system 10 is coiled up to form a loop having a diameter less than the width of the pouch 62. The system 10 is then inserted into the pouch 62 and secured using the top zipper 64, or other sealing means. The pouch also includes snaps 68, or other attachment means, for attaching the pouch 62 to a garment (not shown).

Figure 5:
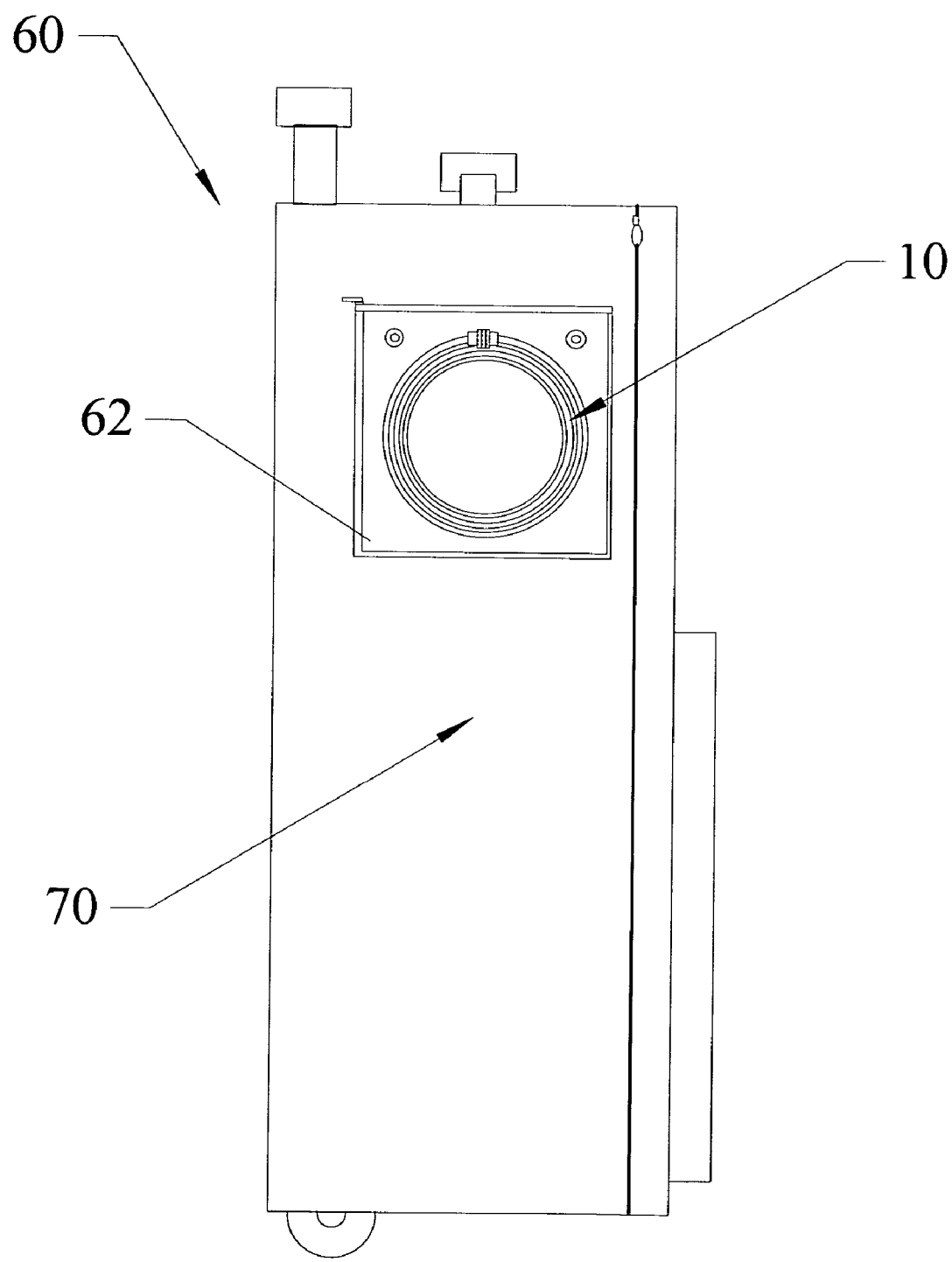
FIG. 5 is a diagrammatic side view of a suitcase that integrates the system and kit of the present invention thereto.

FIG. 5 shows an item of apparel, here a suitcase 70, into which the locking system 10 is integrated to form another embodiment of the kit 60. The suitcase 70 it includes a pouch 62 that is permanently or removably attached thereto in order to allow the system 10 to be efficiently stored. It is envisioned that the present invention will be licensed to apparel manufacturers, who will integrate the pouches into their apparel. Accordingly, it is important to note that the invention is intended to encompass any such apparel, including luggage and garments that include including a pouch to accommodate the locking system.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A locking system comprising:
   a security lock comprising:
   a body;
   a lock mechanism disposed within said body, said lock mechanism being movable between a locked position and an unlocked position;
   a locking member in communication with said body and said lock mechanism, wherein said locking member is dimensioned to be securely held within said lock mechanism when said lock mechanism is in the locked position and to be movable from said lock mechanism when said lock mechanism is in the unlocked position;
   a user interface in communication with said body and adapted to control movement of said lock mechanism between the locked position and the unlocked position, wherein, said user interface comprises at least two movable members and a plurality of symbols disposed upon each of said at least two movable members; and a cable secured to said security lock, wherein said cable is of a length sufficient to at least pass through a pair of arms of a coat and is manufactured of a material that is sufficiently flexible to allow said cable to be coiled when not in use and is sufficiently durable to prevent a potential thief from cutting through said flexible cable with ordinary scissors, and wherein said cable comprises a cable adjustment that is adapted to allow the length of said flexible cable to be shortened to one half of a fully extended length;

wherein said cable is divided into a first cable portion and a second cable portion, wherein said cable adjustment comprises a pair of sliding members that each secure one cable portion and allow another cable portion to slide therethrough, and wherein said cable adjustment further comprises a means for fixing a location of said first cable portion relative to said second cable portion.

2. The locking system as claimed in claim 1 wherein said cable is a 1/16-gauge plastic coated cable and has a length of between four feet and eight feet.

3. The locking system as claimed in claim 1 wherein said means for fixing a location of said first cable portion relative to said second cable portion comprises at least one screw member threaded through said cable adjustment and adapted to engage one of said first cable portion and said second cable portion.

4. The locking system as claimed in claim 1 wherein said user interface of said security lock comprises at least two rotatable discs disposed within and extending from said body, and wherein said plurality of symbols comprises a plurality of numbers, and wherein said lock mechanism further comprises means for changing a combination.

5. The locking system as claimed in claim 4 further comprising:

at least one battery powered light disposed upon said body proximate to said user interface such that light emanating from said battery powered light illuminates said symbols on at least one of said at least two movable members when power is supplied thereto;

at least one battery in electrical communication with said at least one battery powered light;

a power switch for controlling a flow of power from said at least one battery to said battery powered light; and at least one reflector disposed upon said body and dimensioned and adapted to reflect at least a portion of said light emanating from said at least one battery powered light onto said symbols on said at least one movable member;

wherein said at least one battery powered light comprises a light emitting diode and a lens, wherein said lens extends from said body proximate to said user interface, and wherein said reflector extends from said body and over said lens such that light from said light emitting diode is directed upon said numbers disposed upon said rotatable discs of said user interface.

6. The locking system as claimed in claim 1 further comprising:

at least one battery powered light disposed upon said body proximate to said user interface such that light emanating from said battery powered light illuminates said symbols on at least one of said at least two movable members when power is supplied thereto;

at least one battery in electrical communication with said at least one battery powered light;

a power switch for controlling a flow of power from said at least one battery to said battery powered light; and at least one reflector disposed upon said body and dimensioned and adapted to reflect at least a portion of said light emanating from said at least one battery powered light onto said symbols on said at least one movable member;

wherein said power switch of said security lock comprises a button type switch disposed within said body, wherein said button type switch comprises a depressable button and is adapted to allow power to flow to said battery powered light when said button is depressed and to prevent power from flowing to said batter powered light when said button is not depressed.

7. A locking system kit, wherein said kit comprises:

a locking system comprising a security lock and a cable;

wherein said security lock comprises:

a body;

a lock mechanism disposed within said body, said lock mechanism being movable between a locked position and an unlocked position;

a locking member in communication with said body and said lock mechanism, wherein said locking member is dimensioned to be securely held within said lock mechanism when said lock mechanism is in the locked position and to be movable from said lock mechanism when said lock mechanism is in the unlocked position; and a user interface in communication with said body and adapted to control movement of said lock mechanism between the locked position and the unlocked position, wherein said user interface comprises at least one movable member and a plurality of symbols disposed upon said movable member; and wherein said cable is dimensioned for communication with said security lock, wherein said cable is of a length sufficient to at least pass through a pair of arms of a coat and is manufactured of a material that is sufficiently flexible to allow said cable to be coiled when not in use and is sufficiently durable to prevent a potential thief from cutting through said flexible cable with ordinary scissors; and a pouch dimensioned to store and transport said locking system when said locking system is not in use; wherein said pouch comprises sealing means for sealing said pouch such that said locking system is restrained within said pouch, and wherein said pouch further comprises attachment means for attaching said pouch to an item of apparel.

8. The kit as claimed in claim 7 wherein said security lock of said locking system further comprises:

at least one battery powered light disposed upon said body proximate to said user interface such that light emanating from said battery powered light illuminates said symbols on at least one of said at least two movable members when power is supplied thereto;

at least one battery in electrical communication with said at least one battery powered light;

a power switch for controlling a flow of power from said at least one battery to said battery powered light; and at least one reflector disposed upon said body and dimensioned and adapted to reflect at least a portion of said light emanating from said at least one battery powered light onto said symbols on said at least one movable member.

9. The kit as claimed in claim 8:
wherein said user interface of said security lock comprises at least two rotatable discs disposed within and extending from said body;
wherein said plurality of symbols comprises a plurality of numbers;
wherein said lock mechanism further comprises means for changing a combination;
wherein said at least one battery powered light comprises a light emitting diode and a lens;
wherein said lens extends from said body proximate to said user interface; and
wherein said reflector extends from said body and over said lens such that light from said light emitting diode is directed upon said numbers disposed upon said rotatable discs of said user interface.

10. The kit as claimed in claim 7 wherein said cable comprises a cable adjustment that is adapted to allow the length of said flexible cable to be shortened.

11. The kit as claimed in claim 7 further comprising an item of apparel, wherein said item of apparel comprises pouch attachment means adapted to mate with said attachment means of said pouch.

12. The kit as claimed in claim 11 wherein said attachment means of said pouch and said pouch attachment means of said item of apparel comprise a single means for permanently attaching said pouch to said item of apparel.

* * * * *